Figure 1:
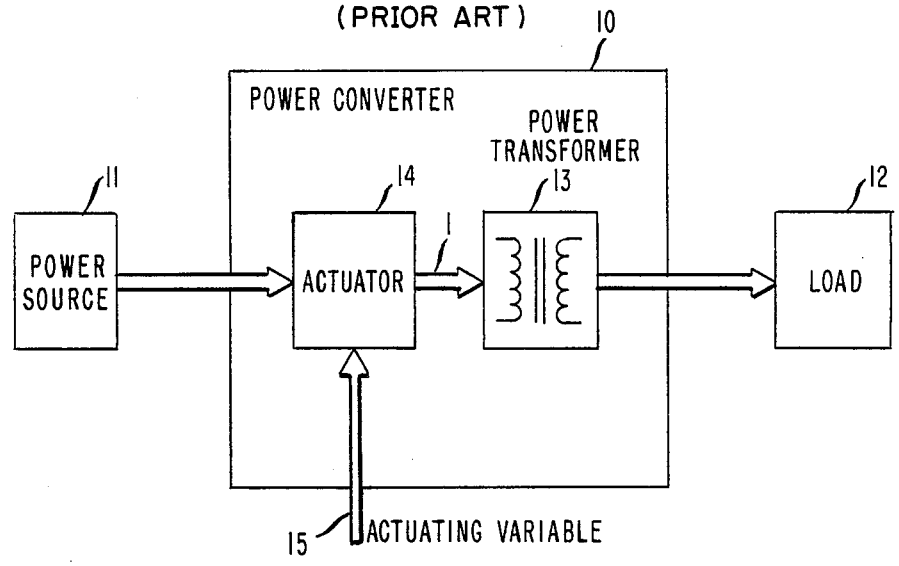

United States Patent [19]

Kislovski

[11] Patent Number: 4,896,091
[45] Date of Patent: Jan. 23, 1990

[54] ELECTRIC POWER CONVERTER

[75] Inventor: André Kislovski, Bern, Switzerland

[73] Assignee: Hasler AG, Bern, Switzerland

[21] Appl. No.: 86,633

[22] PCT Filed: Sep. 2, 1986

[86] PCT No.: PCT/CH86/00124
§ 371 Date: Jul. 7, 1987
§ 102(e) Date: Jul. 7, 1987

[87] PCT Pub. No.: WO87/01834
PCT Pub. Date: Mar. 26, 1987

Related U.S. Application Data

[63] Continuation-in-part of Ser. No. 53,367, Jun. 29, 1987, Pat. No. 4,853,611.

[30] Foreign Application Priority Data

Sep. 13, 1985 [CH] Switzerland .......................... 3964/85

[51] Int. Cl.$^4$ .............................................. G05F 1/32
[52] U.S. Cl. .................................... 323/253; 323/335; 363/91
[58] Field of Search ............................ 363/90, 91, 75; 323/251, 253, 332, 335, 336, 337

[56] References Cited

U.S. PATENT DOCUMENTS

| | | | |
|---|---|---|---|
| 2,586,657 | 2/1952 | Holt, Jr. | 323/335 |
| 2,773,134 | 12/1956 | Dunnet | 323/335 |
| 2,782,269 | 2/1957 | Grant | 323/335 X |
| 2,802,186 | 8/1957 | Dewitz | 323/335 X |
| 3,042,848 | 7/1962 | Muchnick et al. | 321/19 |
| 3,250,695 | 5/1966 | Winslow, Jr. et al. | 204/305 |
| 3,389,330 | 6/1968 | Demeur | 323/335 |
| 3,452,268 | 6/1969 | Grossoehme | 363/91 |
| 3,541,428 | 11/1970 | Schwartz | 323/253 |
| 3,631,534 | 12/1971 | Hirota et al. | 336/155 |

FOREIGN PATENT DOCUMENTS 2108296  5/1983  United Kingdom ............... 210/214

Primary Examiner—Patrick R. Salce
Assistant Examiner—Kristine Peckman
Attorney, Agent, or Firm—Horst M. Kasper

[57] ABSTRACT

The power converter (10) serves for conditioning an electricity supply for a load (12), whereby the supply is derived from a power source (11) and is adapted to the requirements of the load (12) in respect of the electrical values. The converter (10) comprises in its simplest version exclusively a transformer (13) and an inductive resistor connected in series with the latter and designated as an actuator (14). This actuator (14) is constructed from two coaxially-arranged, identical and annularly closed variety cores (111, 112), which are individually surrounded by partial windings of an induction winding (150) and jointly by a control winding (117). The latter (117) is joined to a control system (30), which by means of a control current (I) sets an inductivity value (L) of the actuator (14), which can be varied within wide ranges (1.100). The actuator (14) acts with its appropriate inductivity value (L) on the alternating current (i) passing through its induction winding (150) in the same way as a conventional choke of an equivalent inductivity value (L), in other words, without any distortion. The in-series arrangement of the actuator (14) and transformer (13) thus has, on the alternating current (i), the action of a pure, electrically adjustable voltage divider.

13 Claims, 5 Drawing Sheets

ELECTRIC POWER CONVERTER

CROSS-REFERENCE TO RELATED APPLICATIONS

This application is a continuation-in-part application of another application filed June 29, 1987 and bearing Ser. No. 053,367, now U.S. Pat. No. 4,853,611. The entire disclosure of this latter application, including the drawings thereof, is hereby incorporated in this application as if fully set forth herein.

The invention relates to an electric power converter.

Electric power converters serve to transform and to provide an electrical power for a load when, in the source of the electrical power such as, for example, the 50 Hz alternating-current network or a solar cell battery, the electrical values such as voltage, frequency, etc. do not correspond to the needs of the consumer. In a broad sense, each power transformer corresponds to a power converter. In a restricted sense, one speaks of power converters if the output values, for example the output voltage, are controlled or automatically regulated.

There are known electric power converters with power capacities of a few watts up to several hundreds of kilowatts and they operate according to an entire series of different principles. The switched mode principle in various variants has asserted itself in the past decade, in particular for the feeding of electronic apparatus of medium power requirements; the latter based on a high degree of efficiency and small construction size.

The automatic regulation of such power converters is predominantly performed by pulse-width modulation or by resonance cells through frequency control. In this case, regular important secondary conditions are to be taken into account, such as switching on and switching off behavior, short-circuit safety, dynamic control behavior in case of sudden load changes, etc. These secondary conditions and their domination are frequently decisive for the technical and economic value of a power converter.

It is the object of the invention to provide a new class of power converters which exhibit substantially improved control properties while essentially retaining the switched mode principle.

This object is solved by using a novel component, as it is described in detail in a patent application, forming a parent application of this application and published as a PCT-application (PCT/CH86/00119) (U.S. Ser. No. 053,367).

In the following, the invention is described in detail by way of example by means of nine figures. In this connection, reference is being made in various instances to the state of the art. They show:

FIG. 1—Schematic representation of a controlled electric power converter

Figure 2:
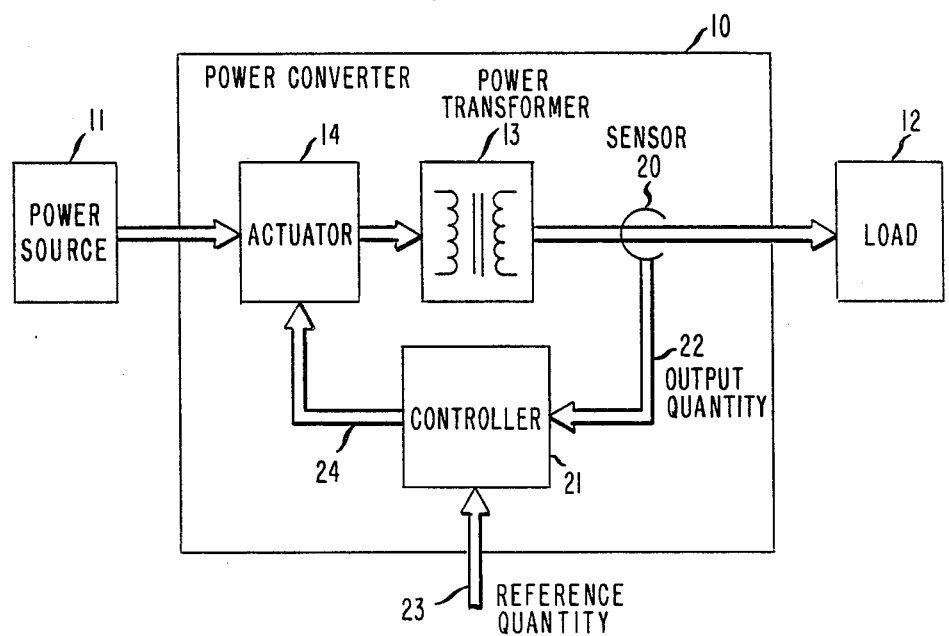

FIG. 2—Schematic representation of an automatically regulated power converter

Figure 3:
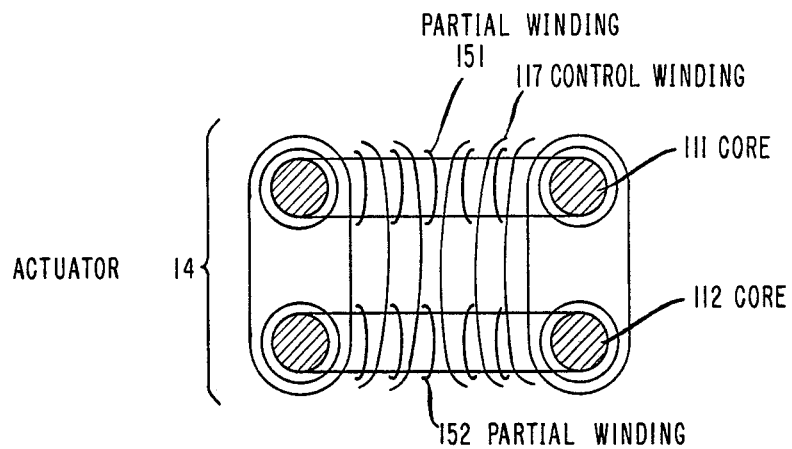

FIG. 3—Sectional drawing of an actuator

Figure 4:
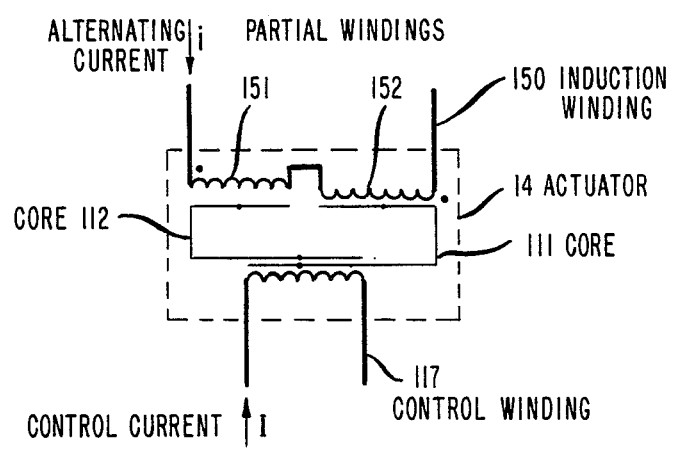

FIG. 4—Symbolic representation of the actuator

FIGS. 5 to 9—Block diagram of various forms of execution of electric power converters.

FIG. 1 shows a first, very schematic and in fact known block diagram of an electric power converter 10, that transmits the power from an arbitrary power source 11 to an also arbitrary load 12. As possible power sources, there are named, among others, the general 50-Hz alternating-current network, a direct-current source fed from said network, i.e. a power rectifier with smoothing filter, a rechargeable battery, a buffered solar-cell battery; as a possible load 12, there is preferred an electric or electronic circuit arrangement, for example, an oscillograph.

The power converter 10 comprises an isolating transformer or power transformer 13 that, on the one hand, galvanically separates the primary side of the converter 10 from its secondary side and, on the other, transforms an alternating current i of a primary-side level to a secondary-side level. The power converter 10 further comprises an actuator 14 over which the power that is supplied to the consumer is adjustable by means of a suitable actuating variable 15.

Preferably, the alternating current i exhibits a frequency w which, due to the size of the transformer 13, is higher than 1 kHz and, due to the acoustical audibility, is higher than 15 kHz. The frequency is upwardly restricted to approximately 100 kHz due to today's material and circuit properties of the actuator 14 and of the transformer 13. However, this value should soon be able to be increased to 1 MHz. The form of the alternating current i can be sinusoidal or, as a chopped direct current, rectangular. Other forms are not customarily used, are however quite possible.

The arrangement according to FIG. 1 represents as a whole an arrangement regulated via the variable 15. Contrary to this, FIG. 2 shows a controlled arrangement. In this case, the power converter 10 is completed by a sensor 20 that measures, for example, the voltage of the secondary-side current supplied to the load 12, and by a controller 21 that produces a controlling quantity 24 from the output quantity 22 of the sensor 20 and from an externally enterable reference quantity 23 and feeds this quantity to the actuator 14.

A single control can be a single open control 14, 30, an open control, a closed loop control 14, 20, 21 or a closed loop automatic control.

It is known from the automatic control engineering where and how further sensors 20 can be arranged, how the controller 21 is constructed, and how the units 20, 21, and 14 cooperate in principle as a closed-loop control circuit.

The actuator 14 is, in contrast to all known power converters 10, a variable linear inductor, the inductance L of which can be electrically varied, i.e. via a control current I, over values having a ratio of at least 1:100. This inductive resistor is series-connected to the power transformer 13 and, in fact, preferably to the primary winding of the transformer 13. Its properties correspond completely to those of a regular choke coil, apart from the possibility of the electrical variability of its inductance L and, thus, of its reactance wL. Therefore, the actuator 14 influences exclusively the amplitude of the alternating current and, in fact, in such a way that, in the meaning of a voltage divider, a corresponding part of the voltage respectively present at the actuator 14, and respectively at the transformer 13, falls off at the respective ratio of the reactance of the actuator 14 and of the transformer 13. In this case, no distortion occurs, which means that the spectrum of the Fourier decomposition of the voltage remains constant. This is the decisive and advantageous difference to the pulse-width modulation, for example, in which case a different voltage spectrum is assigned to each pulse width.

An inductive resistor suitable as an actuator 14 having the described properties is described in detail in the cited, independent, and as yet unpublished patent application. According to FIG. 3, the actuator is preferably constructed from two identical, ferromagnetic, capable of high frequency, co-axially arranged, cylindrical or, preferably, toroidal cores 111, 112, in particular ferrite cores (shown as a section), each one of which is uniformly surrounded substantially over its entire perimeter with a partial winding 151, or 152, respectively, having the same number of turns. These partial windings have an opposite sense of winding and form, connected in series, an induction winding 150 that is being passed through by the alternating current i. To this is added a control winding 117 that, in a second working step, is jointly wound over the coaxially combined cores 111, 112 and their partial windings 151, 152, again uniformly over the full perimeter, whereby, as a side effect, it mechanically holds together the cores 111 and 112. The control winding 117 is passed by the recited control current I, whereby, in each case, an allocated inductance value L for the induction winding 150 is set by the respective equal premagnetization of the cores 111 and 112. Based on the described geometry of the actuator 14, this inductance is constant for alternating currents i with amplitudes that are not too high, in other words, its behavior is at all times that of an ordinary choke coil with a respectively corresponding inductance value L.

FIG. 4 illustrates a symbolic representation of the actuator 14, where the reference numerals correspond to those of FIG. 3. The galvanic separation of the induction winding 150 and of the control winding 117 can be clearly gathered from this representation. It is not shown that, instead of one induction winding 150 and/or one control winding 117, two or more corresponding windings can also be provided without any problems.

Figure 5:
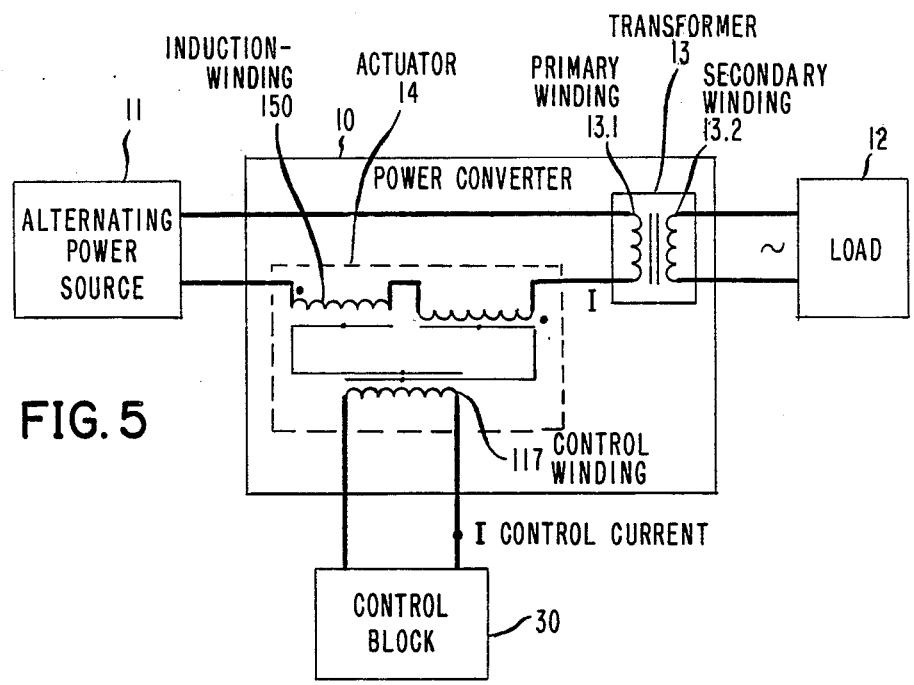

FIG. 5 shows a detailed block diagram of a first embodiment of an electric power converter 10 and, in particular, of an AC/AC converter. The converter 10 comprises a single actuator 14 and a transformer 13. The induction winding 150 is connected in series with the primary winding 13.1 of the transformer 13 and is connected, together with this, to an alternating current source 11, for example a sine-wave oscillator. The secondary winding 13.2 feeds, for example, the ohmic load 12. The control winding 117 is connected to a control block 30, formed as a variable current source, providing an adjustable control current I. This power converter operates as a transformer having a variable output voltage, that is, as an electrically controlled variable-voltage transformer.

If one exchanges the power source 11 and the load 12 in FIG. 5, then the secondary winding of the transformer 13 and the actuator 14 are in series. In this case as well, the resultant effect is that of a variable-voltage transformer.

Figure 6:
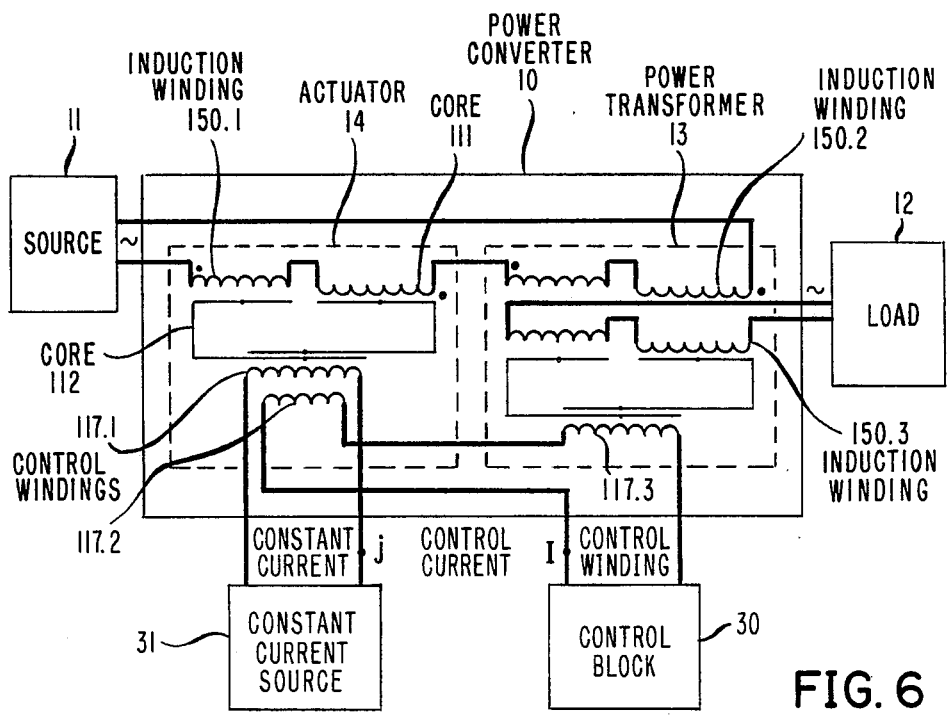

FIG. 6 illustrates a further variant of the described AC/AC converter or of the electrically controlled variable-voltage transformer, respectively. The actuator 14 of the power converter 10 exhibits two control windings 117.1 and 117.2. The power transformer 13 is of the same construction as the actuator 14 and comprises a control winding 117.3 as well as two induction windings 150.2 and 150.3 of which the one (150.2) serves as primary winding, and the other (150.3) as secondary winding of the transformer 13. The control winding 117.1 of the actuator 14 is connected to a constant current source 31 which provides a constant current j of such magnitude that the cores 111 and 112 of the actuator are magnetically saturated. The other control winding 117.2 of the actuator 14 is connected in series with the control winding 117.3 of the transformer 13 to the control block 30 in such a way that their control current I, depending on its magnitude, demagnetizes more or less the cores 111 and 112 in counteraction to the current j and correspondingly magnetizes the cores of the transformer 13. In this way, the inductance value $L_S$ of the actuator 14 decreases if the inductance value $L_T$ of the transformer 13 increases and vice versa. The reactance wL of the two elements thus varies in opposite sense which, in contrast to the arrangement of FIG. 5, results in an increased potentiometric effect with a correspondingly improved possibility of automatic control of the secondary voltage and the current coupled therewith fed to the load 12.

Figure 7:
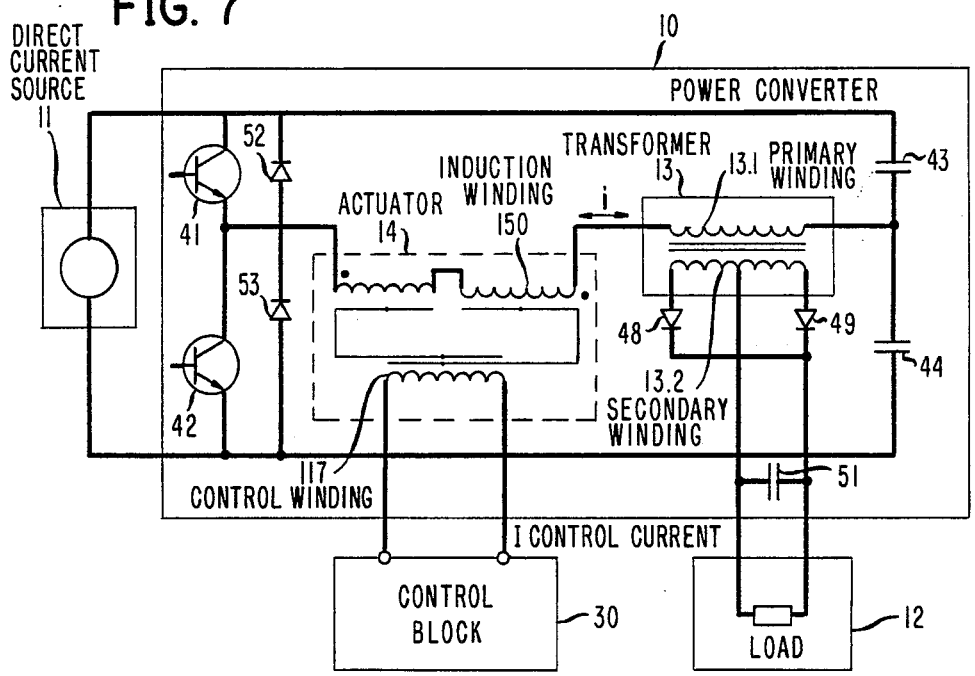

FIG. 7 illustrates a further electric power converter and, in particular, a DC/DC converter. The converter comprises two switching transistors 41, 42 which, at a fixed frequency, for example 100 kHz, chop the current of a direct-current source 11 and alternatingly load two capacitors 43 and 44 via the induction winding 150 of the actuator 14 and the primary winding 13.1 of the power transformer 13, connected in series therewith.

The thereby generated alternating current i is transformed from the primary winding 13.1 to the secondary winding 13.2 of the transformer 13, rectified via diodes 48, 49, and fed to the load 12, for example an electronic circuit. A capacitor 51 serves for smoothing, and the diodes 52, 52 parallel to the transistors 41, 42 for their protection. Fluctuations of the load and of the power source 11 are compensated for by changing the reactance of the actuator 14. This is again done by a control block 30 and its control current I via the control winding 117 of the actuator 14.

Figure 8:
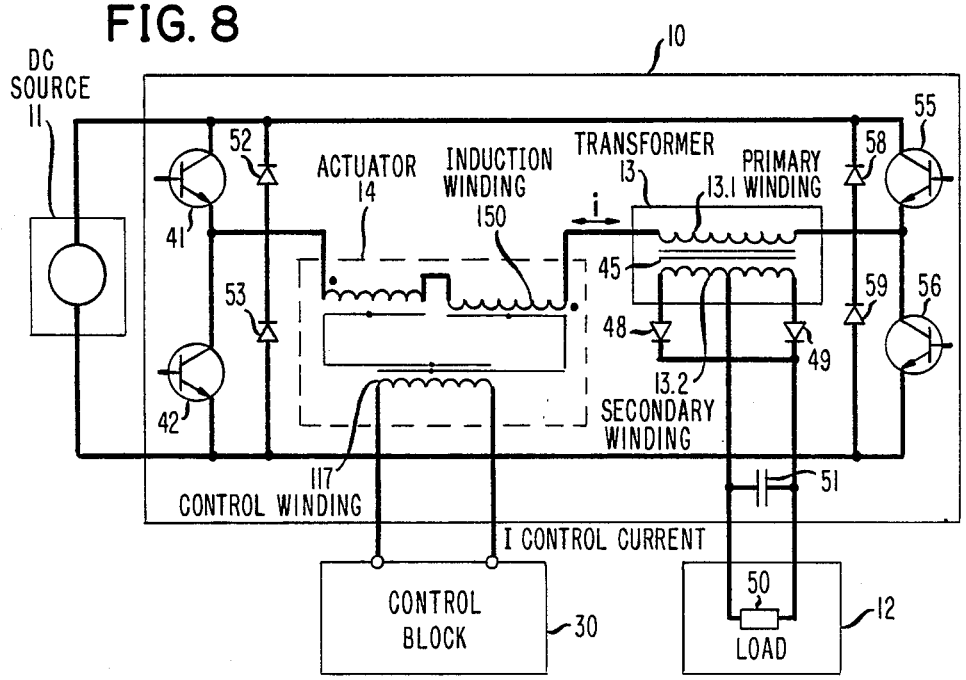

FIG. 8 shows a modification of the power converter of FIG. 7, where the capacitors 43 and 44 are substituted by two additional switching transistors 55, 56 and the protective diodes 58, 59, connected parallel to said transistors. In this power converter, the series connection of the induction winding 150 and of the primary winding 13.1 is disposed in a bridge branch of a switching bridge formed by the switching transistors 41, 42, 55, 56. The transistors are being turned on and off at a fixed frequency by a switching control, not shown here, whereby the direct current of the source 11 is chopped and the switching bridge is alternately passed by the current i in the one and the other direction, where the value of this current can be set or controlled, respectively, by the reactance of the actuator 14.

Figure 9:
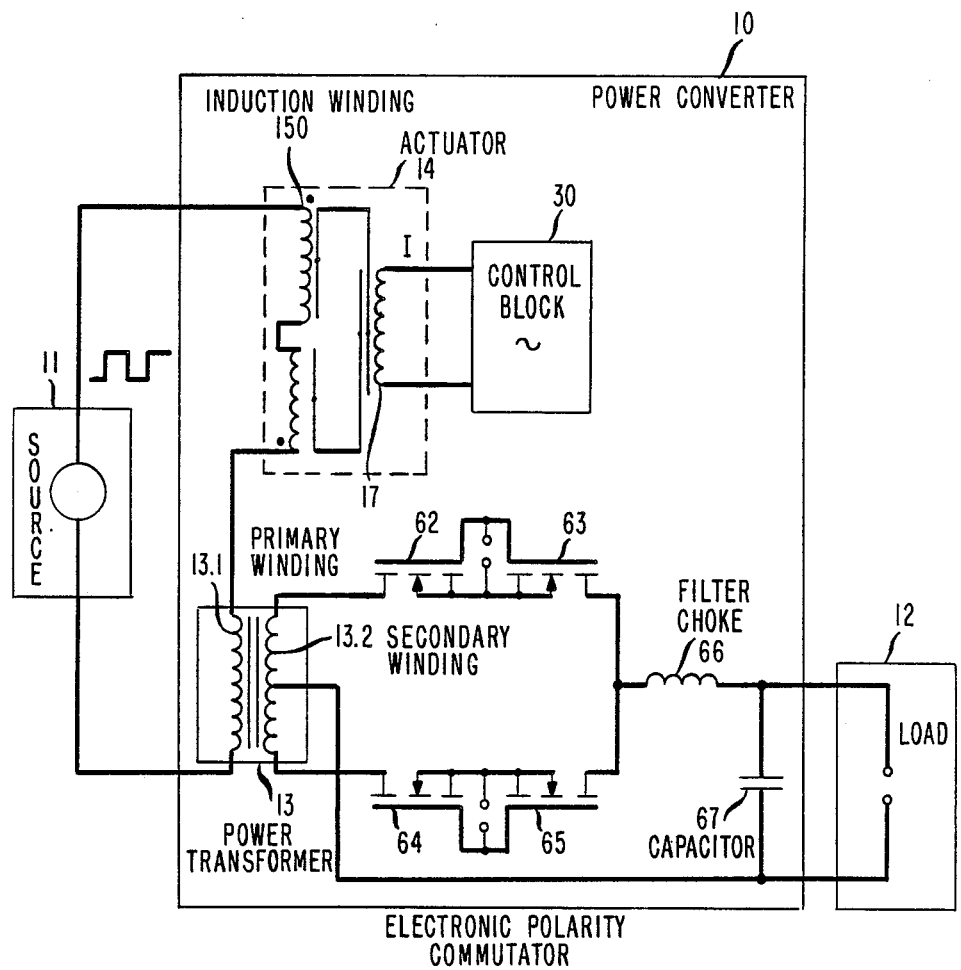

FIG. 9 shows a further power converter which converts the power of an alternating current source 11 into a controlled direct current with a changing polarity, that is to say, an AC/AC converter. The induction winding 150 of the actuator 14 is again connected in series with the primary winding 13.1 of the power transformer 13 and is connected to the source 11. An electronic polarity commutator, such as is known, for example, from P. U. Lind, "Four quadrant bilateral power converter," Proc. of Powerconversion, (Sept. 1982), is connected to the secondary winding 13.2 of the transformer 13. This commutator exhibits four switching transistors 62 to 65 which charge, via a filter choke 66, a capacitor 67 which is connected to the load 12. The commutator rectifies the transformed alternating current at the cycles of the alternating current power source 11 with very small losses. The power control is again performed via the control current I, which is delivered from a control block 30 to the control winding 117 of the actuator 14.

In the case of the power converters illustrated in FIGS. 5 to 9, the respective control block 30 could, without any difficulty, be substituted by a closed-loop control in accordance with FIG. 2. This is even the preferred embodiment since, in general today, power converters must meet very high automatic-control technique requirements. This novel type of actuator 14 offers in this context excellent possibilities for improving the control properties, as stated in the following.

In principle, all of the illustrated power converters 10 operate at constant frequency of the alternating current i. This is advantageous in several respects. However, it is easily possible to vary the frequency w of the alternating current i in addition to the automatic control of the inductance value L of the actuator 14, for example for balancing of short-term transients, which effects an additional change of the reactance wL of the actuator 14.

The switching on, switching off, and short-circuit behavior of the power converter 10 is excellent, since the alternating current i can never exceed permissible values based on an ever present reactance of the actuator 14. In case of a power outage of the control current I, the reactance increases automatically, which is a positive safety aspect. In case of a secondary-side short circuit, which corresponds to a load power of arbitrary size, the reactance of the actuator can be brought to a maximum value by switching off of the control current I. In addition, the reactance can be increased by increasing the frequency of the alternating current i.

The power converter 10 exhibits all the properties of a current source. Thereby difficulties that are associated with other converters, for example pulse-width-controlled converters, which are caused by the so-called recovery time $t_{rr}$ of the rectifier diodes, are eliminated. The relief networks required for overcoming these difficulties are therefore not necessary.

Stray inductivities of the power transformer 13 do not influence the properties and the functioning of the actuator 14.

The automatic control of the reactance of the actuator 14 via the control current I is performed galvanically separated from the controlled current i. Several control currents can be used independently from one another via several control windings 117.

The actuator is mechanically, electrically, magnetically, and thermally stable. It can be produced relatively inexpensively in various desired device sizes and can be adapted to the respective requirements. Its application does not require any special precaution measures.

The adjustment of the control current I to the value which corresponds in each case to the desired reactance is simple and can be performed with known methods, for example a transistor amplifier.

I claim:

1. An electrical power converter, comprising a power transformer which separates galvanically a power source at its primary side from a load at its secondary side, and comprising a final control element, the regulating actuator unit of which is a variable linear inductor and which regulating actuator operates linearly relative to an electrical voltage applied or relative to an electrical current applied to the regulating actuator, which regulating actuator has a finite inductance value which value can be measured at the input of the regulating actuator where the reactance of the regulating actuator is controllable by varying the value of the inductance; where the ratio of the minimum of said inductance and the maximum of said inductance is settable relative to said electrical voltage applied or relative to said electrical current applied to the regulating actuator over values having a ratio of at least 1:100 by varying a control current.

2. The electrical power converter according to claim 1, wherein the regulating actuator unit is connected in series with a primary winding of the power transformer.

3. The electrical power converter according to claim 1, wherein the regulating actuator unit is connected in series with a secondary winding of the power transformer.

4. The electrical power converter according to claim 1, wherein the combination of the regulating actuator unit and of the power transformer forms a variable ratio transformer, the ratio of which is electrically variable.

5. The electrical power converter according to claim 1, wherein the regulating actuator unit includes a first core and a second core and wherein an allocated inductance value L is settled by the respective equal premagnetization of the first core and the second core for the induction winding and this inductance is constant for alternating currents with voltage amplitudes that are not too high such that the inductance behavior is at all times that of an ordinary choke coil with a respectively corresponding inductance value.

6. An electrical power converter comprising
a power transformer;
a final control element;
a single control;
wherein the power transformer transforms the electrical power from its primary winding to its secondary winding and it separates galvanically its two sides;
the final control element influences the value of the electrical power fed from the input side of the converter to the output side of the converter;
wherein the function of the control element is that of a variable linear inductor, which means that the DC resistance of the element is zero ($R_{DC}=0$), the AC resistance of the element is $R_{AC}=w.L$, wherein w=angular frequency, w=2 pi f; f measured in Hertz, L=inductance, measured in Henry;
which means the variable linear inductor has no electrical losses and it is a non-dissipative element;
wherein the control element operates as a variable linear inductor and does not distort the individual harmonics of the waveforms of the electrical parameter values;
wherein the control element comprises two identical ferromagnetic cores which are independent from each other and co-axially disposed, and each of said cores is annularly closed, a control winding which winds around the two identical ferromagnetic cores jointly, and an induction winding which winds around the two cores individually in a configuration of two partial windings connected in series, in such a way that magnetic fluxes, created by currents running through the windings in the cores are uni-directional in one of the cores and inverse-directional in the other one of the cores, wherein a functional dependence of the magnetic flux density B on the magnetic field strength H for a soft magnetic core material exhibits a curvature that has a progressively varying incremental permeability over its full region and thus substantially identical in its flux versus field strength curve for increasing and for decreasing field strength, and whose slope varies at least over values having a ratio of 1:100;

wherein the single control is controlling the final control element via a control current fed into the control winding of the element.

7. The electrical power converter according to claim 6 wherein the induction winding of the final control element is connected in series with the power transformer;

wherein the induction winding is connected in series with the primary winding of the transformer;

wherein the induction winding is connected in series with the secondary winding of the transformer.

8. A method of electrical power conversion from the input side of a converter to the output side of the converter comprising a power transformer;
a final control element;
a single control and including the steps:

delivering power at the input side by a power source wherein such power source can be an arbitrary source;

feeding a control current through a control winding of the final control element; linearly regulating the power delivered from the power source to the power transformer by changing the inductance of the final control element by varying the control current.

9. An electrical power converter, comprising a power transformer having an input winding connected to a power source and having an output winding connected to a load and a soft magnetic core interacting with current passing through the windings, which power transformer separates galvanically the power source at its primary side from the load at its secondary side, and comprising a final control element, the regulating actuator unit of which is a variable linear inductor, which regulating actuator operates linearly relative to an electrical voltage or relative to an electrical current applied to it;

which regulating actuator has a finite inductance value, which value can be measured at its input;

where the reactance of the regulating actuator is controllable by varying the value of the inductance;

where said inductance value relative to said electrical voltage applied or to said electrical current applied is variable in a ratio of one to at least one hundred by varying a control current.

10. The electrical power converter according to claim 9, wherein the regulating actuator unit is connected in series with a primary winding of the power transformer.

11. The electrical power converter according to claim 9, wherein the regulating actuator unit is connected in series with a secondary winding of the power transformer.

12. The electrical power converter (10) according to claim 9, wherein the combination of the regulating actuator unit and of the power transformer forms a variable ratio transformer, the ratio of which is electrically variable.

13. The electrical power converter according to claim 9, said regulating actuator unit of which comprises two identical ferromagnetic cores which are independent from each other and coaxially disposed; each one of said cores is annularly closed within itself, a control winding which winds around said two cores jointly, and an induction winding which winds around said two cores individually in a configuration of two partial windings connected in series, in such a way that the magnetic fluxes in said cores, created by the currents running through said windings, are unidirectional in one of said cores and inverse-directional in the other one of said cores, wherein a soft magnetic core material has a functional dependence of the magnetic flux density B on the magnetic field strength H exhibiting a curvature, that has a progressively varying incremental permeability over its full region and thus is substantially identical in its flux versus field strength curve for increasing and for decreasing field strength H, and whose slope varies at least over values having a ratio of 1:100.

* * * * *